United States Patent [19]

Breant

[11] 3,876,833

[45] Apr. 8, 1975

[54] RECEIVER FOR SYNCHRONOUS DATA SIGNALS, INCLUDING A DETECTOR FOR DETECTING TRANSMISSION SPEED CHANGES

[75] Inventor: Pierre Louis Vincent Breant, Clamart, France

[73] Assignee: Telecommunications Radioelectriques et Telephoniques T.R.T., Paris, France

[22] Filed: Nov. 8, 1973

[21] Appl. No.: 413,813

[30] Foreign Application Priority Data

Nov. 10, 1972 France ............................ 72.39931

[52] U.S. Cl. .................. 178/88; 179/15.55; 328/63

[51] Int. Cl. ............................................ H04b 1/66

[58] Field of Search .......... 179/15 BV, 15.55, 2 DP; 178/DIG. 3, 88; 325/39, 321; 328/63

[56] References Cited

UNITED STATES PATENTS

| | | | |
|---|---|---|---|
| 3,286,026 | 11/1966 | Greutman et al. | 178/DIG. 3 |
| 3,324,237 | 6/1967 | Cherry et al. | 178/DIG. 3 |
| 3,467,783 | 9/1969 | Magnuski | 179/15.55 |
| 3,647,967 | 3/1972 | Stein | 178/88 |

*Primary Examiner*—Robert L. Griffin
*Assistant Examiner*—George H. Libman
*Attorney, Agent, or Firm*—Frank R. Trifari; Henry I. Steckler

[57] ABSTRACT

A receiver in a synchronous data transmission system, in which the data may be transmitted at least at two speeds differing by an integral factor N, is provided with a speed change detector. This detector comprises first and second circuits for detecting speeds lower and higher than the local clock rate, the first circuit including a pulse distributor actived by the local clock pulses for distributing pulses at data signal transitions over its N outputs, each of which is connected to a logic circuit of the NAND-type through a circuit detecting the presence of pulses, the second circuit including a data signal sampler activated at the local clock rate, a sample analyzer producing output pulses only for predetermined sample values and a circuit detecting the presence of pulses at the analyzer output. The speed change detector may be used for automatically adjusting the receiver to the speed of the received data.

5 Claims, 9 Drawing Figures

RECEIVER FOR SYNCHRONOUS DATA SIGNALS, INCLUDING A DETECTOR FOR DETECTING TRANSMISSION SPEED CHANGES

The invention relates to a receiver in a system for synchronous data transmission in which the data signals may be transmitted at least at two transmission speeds differing by a factor N, where N is an integer, said receiver being provided with a transition detector for generating pulses at transitions in the received data signal, a clock pulse generator included in a phase control loop to which the pulses from the transition detector are applied for controlling the phase of the clock pulses with the transitions of the received data signal, and a detector for detecting changes in the transmission speed of the received data signal.

It might be imagined that said phase control could correct the local clock pulse frequency as a function of the rhythm with which the symbols occur in the received data signals, so that a detector for detecting changes in the transmission speed would not be necessary in practice. However, when at the start of transmission the difference between the local clock pulse frequency and this rhythm is too large, or when such a difference occurs suddenly during transmission, said phase control is not capable of correcting the clock pulse frequency in the proper way. The phase control only establishes a coincidence of a characteristic instant (for example, a positive going edge) of the clock pulse signal with the transitions of the data signal.

The use of such speed change detectors may be important. They make it possible, for example, that the terminals in a data transmission system can adapt their transmission speeds while these terminals were adjusted at different speeds before the start of transmission.

In addition, these speed change detectors enhance the flexibility of time division multiplex transmission systems, notably in the case of communication between aircraft and ground stations which may take place optionally through satellites; then, for example, the transmission speed can be varied as a function of the requirements of control and density of air traffic. The transmission may be disturbed by noise: then it is of the greatest importance, for reasons of safety, to ensure a minimum connection with an error rate which is not too large. To inhibit the detrimental influence of noise, the pass band of the receiver is then reduced, which results in a lower transmission speed; when the transmission is no longer disturbed a high transmission speed is used again. Thanks to these detectors for detecting a change of the transmission speed all commutation operations involved by these speed variations can be effected automatically.

An obvious solution of detecting a change of the transmission speed in a multiplex system consists in the use of a specific channel for transmitting information regarding the change of the transmission speed.

This solution has drawbacks. Not only it involves an extra load for the multiplex system, but also expensive transmitting and receiving equipment must be used for these extra channels, because it is exactly these channels which must be reliable since they must fulfil a safety function. In addition, the extra weight of this equipment on board an aircraft is considered to be very disadvantageous.

It is an object of the invention to provide a receiver of the kind described in the preamble which obviates the above-mentioned drawbacks and which notably does not require extra channels in a multiplex system for the transmission of information regarding the transmission speed and in which the components already present in conventional data transmission systems are advantageously used.

The receiver according to the invention is characterized in that the speed change detector is provided with a circuit for detecting a decrease in the transmission speed by a factor N, said circuit including a pulse distribution controlled by the clock pulse generator for distributing the pulses from the transition detector in the rhythm of the clock pulses over N outputs, each of which is connected through a circuit for detecting the presence of pulses to a logic selection gate, which generates an output signal in the absence of pulses at least at one of the N outputs of the pulse distributor.

The invention and its advantages will now be described in greater detail with reference to the Figures.

Figure 1:
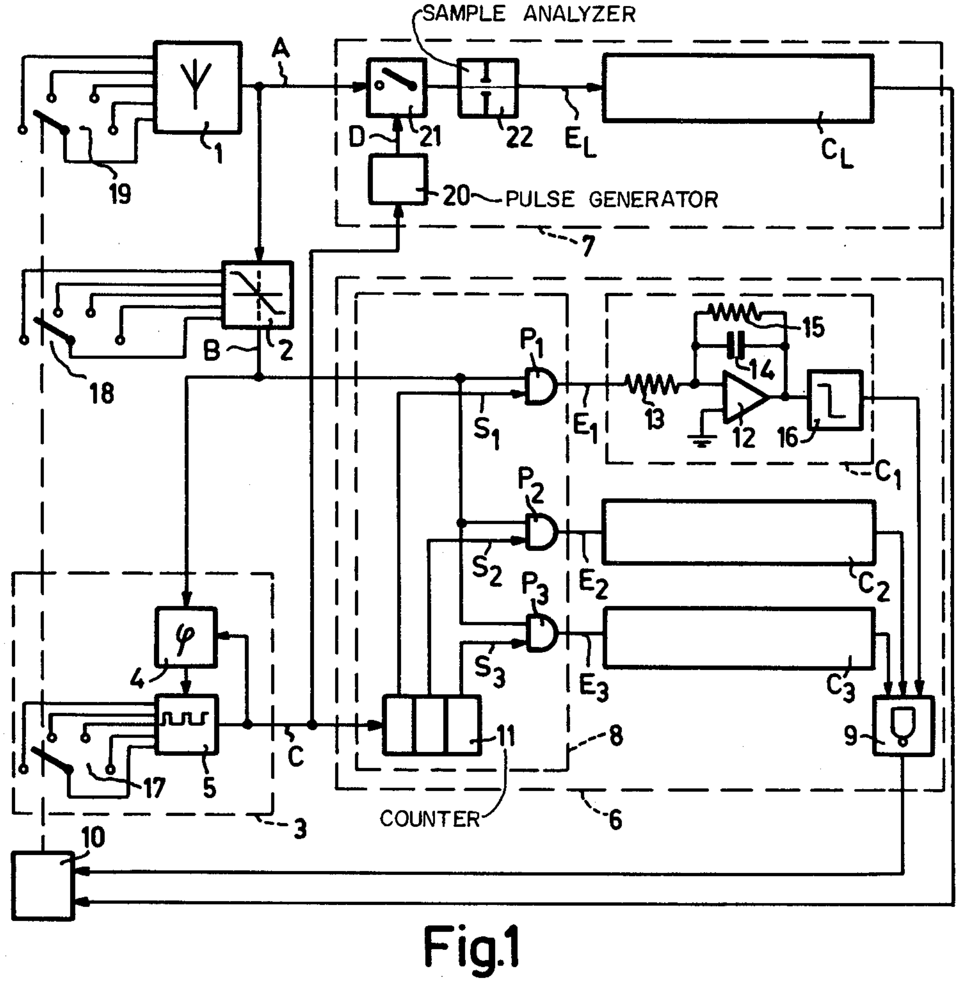
FIG. 1 shows a receiver according to the invention which is adapted for changes of the transmission speed by a factor N = 3.

In FIG. 1 the reference numeral 1 denotes a communication receiver which is present, for example, on board an aircraft. A detected signal representative of the data signal is obtained at the output of this receiver 1 which is connected to a line A. This data signal has, for example, the shape shown in FIG. 2 at A and is of the "non-return-to-zero" type, i.e., the output voltage of the receiver 1 is either positive (+) or negative (−). These two possible values of the received data signal are assumed to occur with the same probability.

Figure 2:
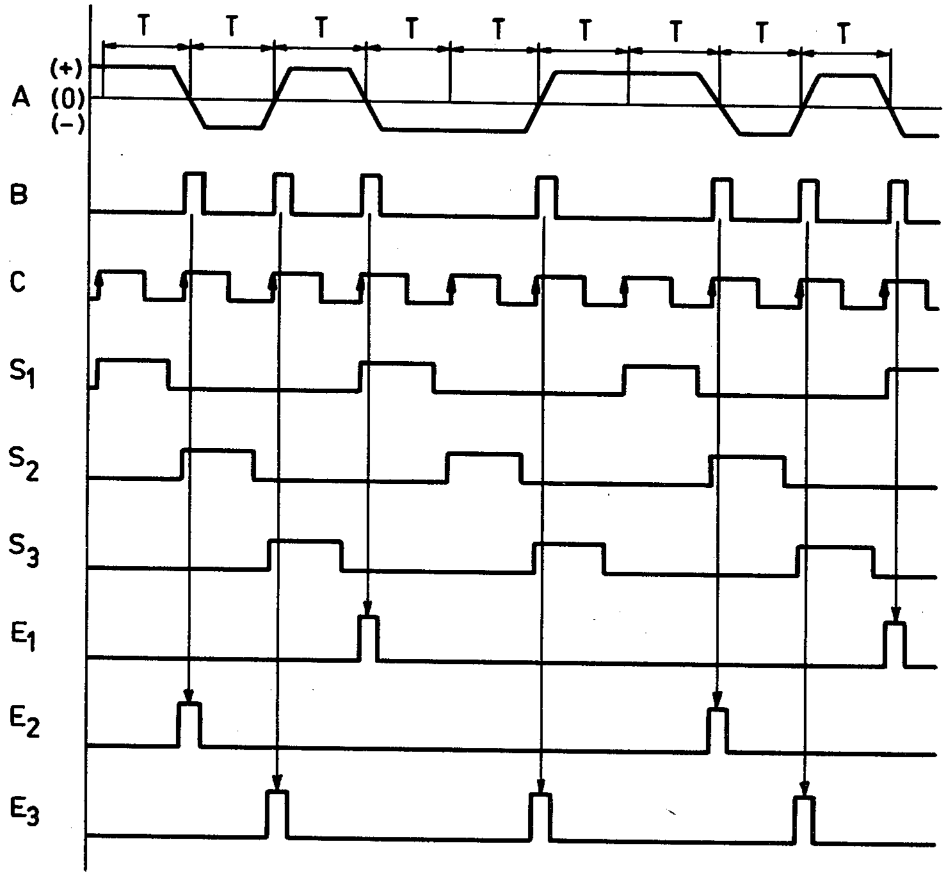
FIG. 2 shows a number of time diagrams to explain the operation of the receiver according to Figure for a "normal" transmission speed.

The transitions between the two possible values of the data signal are detected by a zero crossing detector whose input is connected to line A and whose output is connected to a line B; FIG. 2 shows at B the pulses produced by detector 2 of transitions in the received data signal. The zero crossing detector may be, for example, of the type described in French Pat. Specification No. 2.098,925. These output pulses of detector 2 serve for synchronizing a local clock pulse generator 3 which thus provides clock pulses coinciding with transition of the data signal.

This clock pulse generator 3 may be constituted by a phase detector 4 having two inputs, one of which is connected to line B and the other being connected to the output of a voltage-controlled oscillator 5. Owing to the control voltages generated by phase detector 4, oscillator 5 applies clock pulses to line C, which clock pulses are synchronized with the data signal, i.e., the data signal transitions coincide with, for instance, positive-going edges of the local clock pulse signal (apart from a small time difference). The clock pulse signal is shown in FIG. 2 at C; the period T of these clock pulses is equal to the duration T of each signal element of the received data signal when the transmission speed is "normal."

The components 1 to 5 are present in the receivers of practically all data transmission systems; in the Figure the other components of the receiver of the transmission system processing the signals present on lines A and C are not shown.

Furthermore, the receiver of FIG. 1 includes a detector for detecting changes in the transmission speed of the received data signal. According to the invention this detector is provided with a first circuit 6 and a second circuit 7 for detecting a decrease or increase of the transmission speed by a factor N, (N is an integer and N = 3 in FIG. 1. This first detection circuit 6 includes a pulse distributor 8 controlled by clock pulse generator 3 for distributing the pulses from transition detector 2 over its N outputs in the rhythm of the clock pulses applied through line C. Each of the outputs of pulse distributor 8 is connected through a line $E_1$, $E_2$, $E_3$ to a circuit $C_1$, $C_2$, $C_3$ for detecting the presence of pulses. The outputs of these circuits $C_1$, $C_2$, $C_3$ are connected to the inputs of a logic selection gate 9 which generates an output signal in the absence of pulses at least at one of the outputs of distributor 8. In FIG. 1, selection gate 9 is constituted by a NAND-gate.

The appearance of a signal at the output of NAND-gate 9 may be used, for example, to adjust the transmission system to the transmission speed thus detected by means of a commutation circuit 10.

The pulse distributor 8 is constituted in FIG. 1 by a modulo-3-counter 11 whose input is connected to line C and which supplies an observation signal successively at its three outputs $S_1$, $S_2$ and $S_3$ at every positive-going edge of the clock pulse signal; this observation signal is shown at $S_1$, $S_2$ and $S_3$ in FIG. 2. This pulse distributor 8 is provided with three AND gates $P_1$, $P_2$ and $P_3$ each having two inputs, one of which is connected to line B and the other being connected to one of the outputs $S_1$ (gate $P_1$), $S_2$(gate $P_2$) and $S_3$ (gate $P_3$); the outputs of these gates $P_1$, $P_2$, $P_3$ constitute the outputs of this pulse distributor 8.

The structure of circuit $C_1$ is shown in FIG. 1; it is obvious that the structure of the circuits $C_2$ and $C_3$ may be identical.

In this example circuit $C_1$ is of the analog type and includes an operational amplifier 12, whose input is connected through a resistor 13 to the output of gate $P_1$ and whose input and output are coupled by means of a parallel arrangement of a capacitor 14 and a resistor 15. The output of amplifier 12 is connected to the input of a threshold circuit 16 which only supplies an output voltage when its input voltage is higher than a given threshold level.

The components 12, 13 and 14 constitute an integrator, resistor 15 serves to allow the output voltage of amplifier 12 to decay with a time constant much larger than the time interval between the pulses which may be present at the input of circuit $C_1$.

The operation of this first detection circuit 6 is as follows.

First, the case is considered where the transmission speed is normal, that is to say, the duration of the signal elements of the data signal is equal to the period T of the local clock pulse signal. Since both values of the data signal have the same probability, the transitions of the data signal occur at arbitrary positive-going edges of the clock pulse signal and therefore coincide arbitrarily with observation signals present at outputs $S_1$ – $S_3$. In FIG. 2 the pulses appearing on lines $E_1$, $E_2$ and $E_3$, are shown at $E_1$, $E_2$ and $E_3$ respectively, in accordance with the data signal shown at A in FIG. 2.

A pulse appears on line $E_1$ when there is a coincidence between a pulse on line B and the observation signal present at output $S_1$, and this also applies for all the pulses on lines $E_2$ and $E_3$ with reference to the observation signals at outputs $S_2$ and $S_3$. Statistically, circuits $C_1$ – $C_3$ will receive the same number of pulses at their inputs during a given period, whereby the output voltage of each operational amplifier 12 will increase in the rhythm of the received pulses and will exceed the predetermined threshold level of threshold circuit 16, so that a voltage supplied by threshold circuit 16 will appears at the outputs of all circuits $C_1$ – $C_3$. In this case NAND-gate 9 does not supply an output signal.

Figure 3:
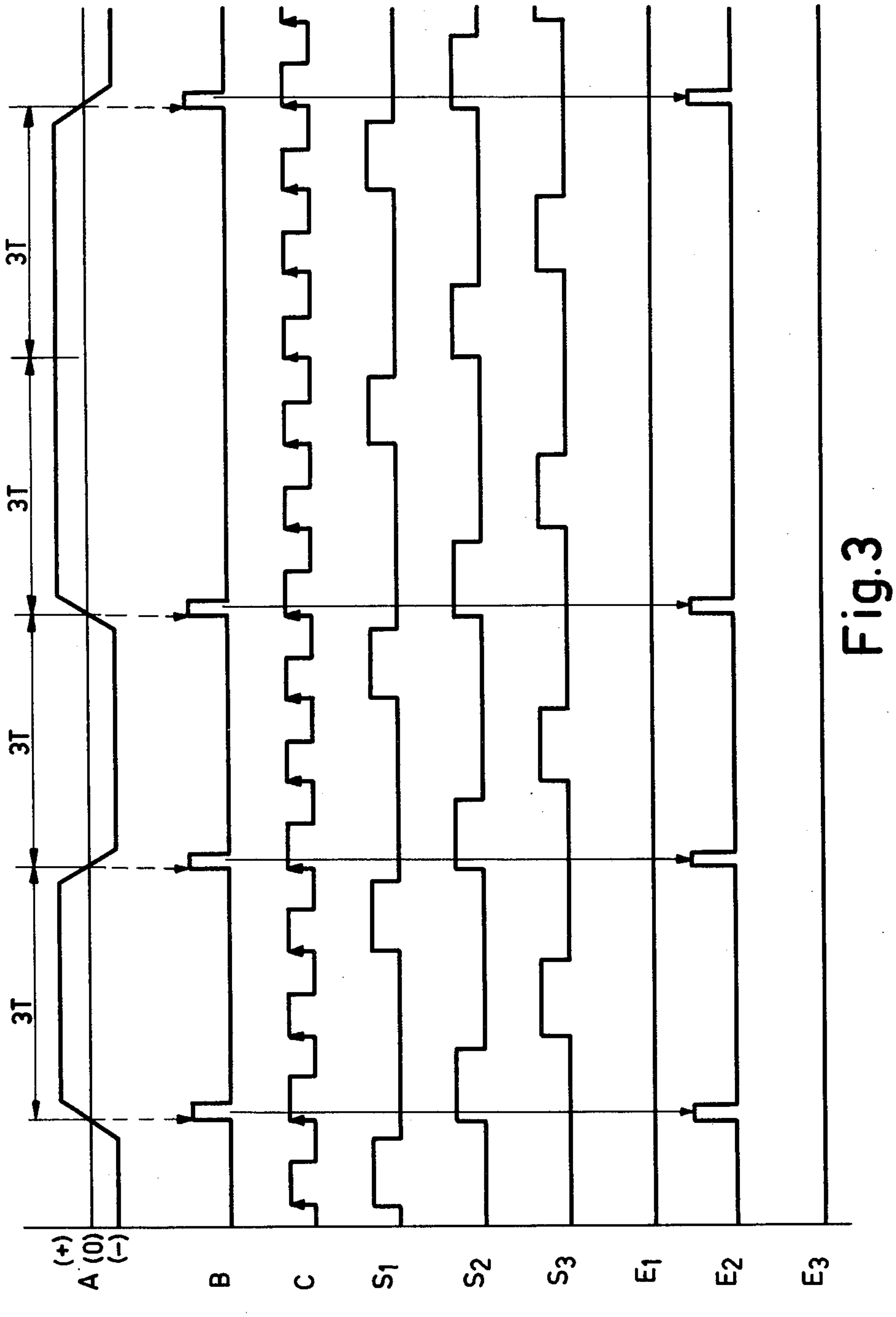
FIG. 3 shows a number of time diagrams to explain the operation of the receiver of FIG. 1 for a transmission speed reduced by a factor of 3.

The case will now be considered where the transmission speed has become three times lower or, in other words, where the duration of the signal elements of the data signal is equal to 3T. Such a data signal is shown at A in FIG. 3; the clock pulses shown at C in FIG. 3 and the output signals of counter 11 shown at $S_1$, $S_2$ and $S_3$ in FIG. 3 are the same as those in FIG. 2 at C, $S_1$, $S_2$ and $S_3$, respectively. FIG. 3 shows that the pulses from zero crossing detector 2 present on line B only coincide with the observation signal present at output $S_2$ of counter 11, which implies that pulses appear only at the input of circuit $C_2$. Since there are no longer any pulses present at the inputs of circuits $C_1$ and $C_3$, the output voltage of the operational amplifiers in circuits $C_1$ and $C_3$ will decrease owing to the presence of the resistor which shunts the capacitor. At a given instant, this output voltage will be lower than the predetermined threshold level so that no voltage appears at the output of circuits $C_1$ and $C_3$.

In this situation NAND-gate 9 provides an output signal. This signal applied to commutation circuit 10 may bring about different commutation operations. Notably a frequency change-over switch 17 of oscillator 5 is operated so that the clock pulse frequency becomes three times lower. Furthermore a change-over switch 18 may be operated for adapting zero crossing detector 2 to this new rhythm and also a change-over switch 19, whose position determines the passband of the commutation receiver 1, for reducing this passband so as to diminish, for example, the influence of noise.

Then, clock pulse generator 3 may also be utilized for transmitting data signals whose transmission speed is equal to that of the received data signal, which speed is thus determined by the new period of the clock pulse signal.

In the case where the signal-to-noise ratio is high and the output signal of the communication receiver 1 is reshaped by a threshold circuit (not shown), it is possible to transmit the data signals at a transmission speed which is three times higher. According to the invention the speed change detector also includes a second circuit 7 for detecting an increase in the transmission speed by a factor N (again N = 3 in FIG. 1). This second detection circuit 7 includes a circuit 21 for sampling the received data signal, which, sampling circuit 21 is controlled by a pulse generator 20 connected to clock pulse generator 3 for generating a sampling pulse at least at one of the instants T/N, 2T/N, . . . . . . , (N−1)T/N after the instant of occurrence of each clock pulse, where T is the period of the clock pulses. Furthermore this second detection circuit 7 includes a sample analyzer 22 connected to sampling circuit 21, which analyzer only generates pulses in case of samples substantially corresponding to crossings of the received data signal through a given reference level, and a circuit $C_L$ which is connected through a line $E_L$ to sample analyzer 22 for detecting the presence of pulses and generating an output siignal in the presence of these pulses.

In FIG. 1, pulse generator 20 is constituted, for example, by two monostable triggers arranged in cascade which apply a sampling pulse to line D at an instant T/3 (and/or 2T/3) after a positive-going edge of the clock pulse signal from clock pulse generator 3. Furthermore sample analyzer 22 in FIG. 1 only provides a pulse when the sample at its input has the value zero or differs only slightly therefrom. Circuit $C_L$ for detecting the presence of pulses may have the same structure as circuit $C_1$ in first detection circuit 6.

The operation of this second detection circuit 7 is as follows.

Figure 4:
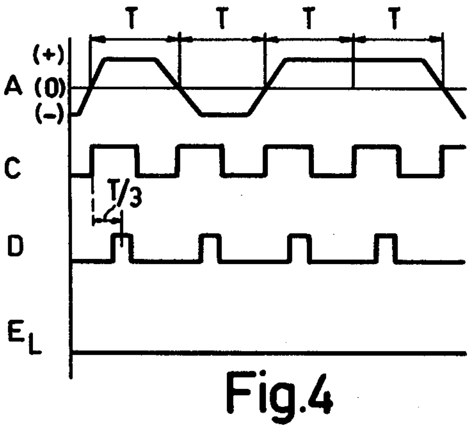
FIGS. 4 and 5 show a number of time diagrams to explain the operation of the receiver of FIG. 1 for a transmission speed increased by a factor of 3.

The pulse generator 20 supplies sampling pulses which are shown at D in FIG. 4; these sampling pulses are thus present at an instant T/3 after each positive-going edge of the clock pulse signal shown at C in FIG. 4. For a data signal whose signal elements have the normal duration T (compare A in FIG. 4), the data signal always has one of the two possible values (+) or (−) at the instants when the sampling pulses appear so that no zero crossings can be detected by sample analyzer 22 and no pulse appears on line $E_L$ (compare $E_L$ in FIG. 4).

Figure 5:
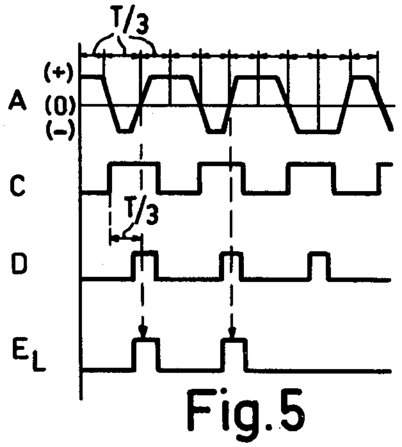

For a data signal whose signal elements have a duration which is three times shorter, hence a duration of T/3 (compare A in FIG. 5), the data signal may present a zero crossing at the instants when the sampling pulses shown at D in FIG. 5 appear. In that case pulses are applied to line $E_L$, as shown at $E_L$ in FIG. 5. These pulses cause an output signal of circuit $E_L$ (in the same way as in circuit $C_1$). This output signal, which indicates the use of a higher transmission speed than the normal one, is applied to commutation circuit 10 to enable the transmission system to adapt to this new speed.

The transmission speed may then be too high for the adjusted passband of communication receiver 1. In that case there is no signal on line A, that is to say, the samples at the output of sampling circuit 21 always have the value of zero and hence a pulse appears on line $E_L$ at every sampling instant so that also in this case the use of a higher transmission speed is indicated.

The different circuits $C_1 - C_3$ and $C_L$ have an intergration function and thus render the speed change detector 6, 7 particularly insensitive to noise, thereby preventing erroneous commutation operations in the receiver according to FIG. 1. This detector 6, 7 enables the transmission system to adapt to different transmission speeds by successive detection of occurring speed changes.

After the above explanation for the case where N = 3, the structure of a detector capable of detecting changes in transmission speeds by an arbitrary integral factor N needs hardly to be explained. In fact, the first detection circuit 6 is then to be provided with a pulse distributor 11 having N outputs individually connected to a circuit, which detects the presence of pulses and whose output is connected to one of the N inputs of a NAND-gate 9. As regards the second detection circuit 7, the only difference is the construction of the pulse generator 20 which must supply sampling pulses at least at one of the instants T/N, 2T/N, . . . . . , (N-1)T/N after a positive-going edge of the clock pulse signal.

Figure 6:
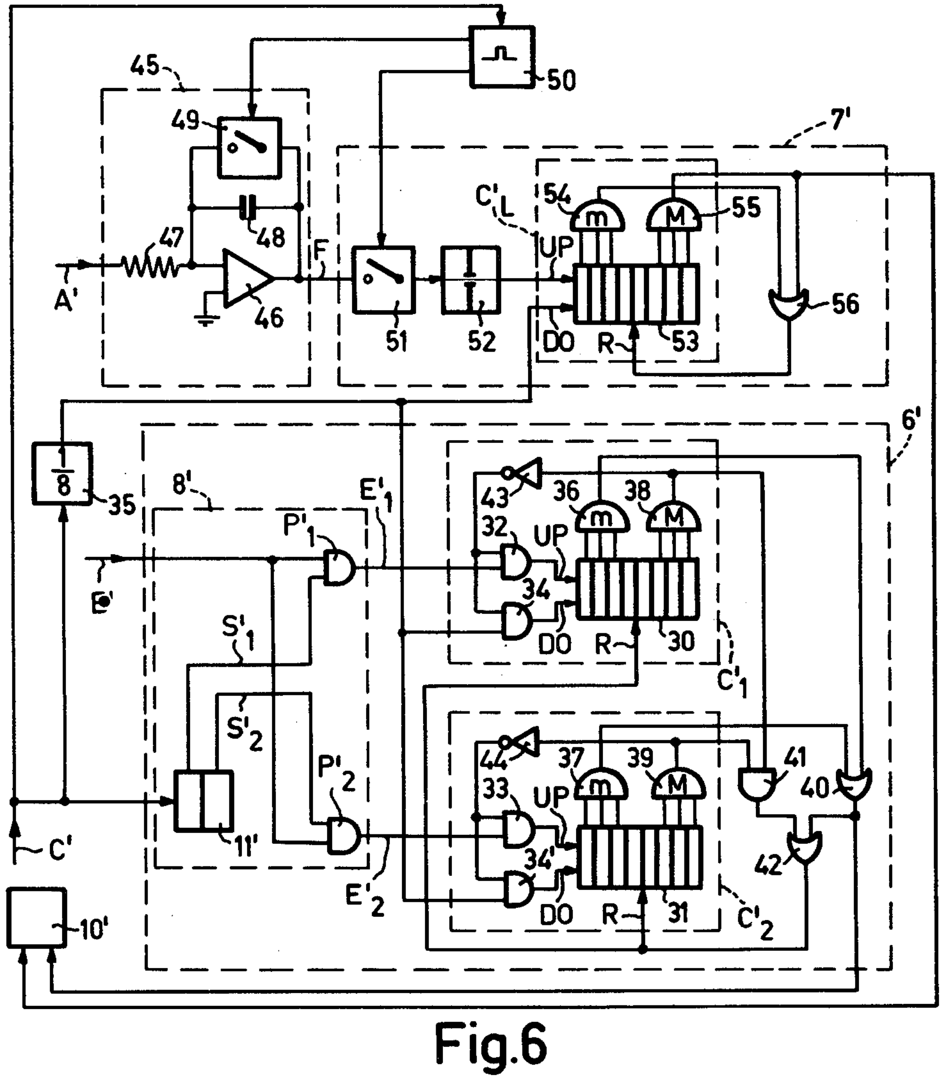
FIG. 6 shows part of a modification of the receiver according to FIG. 1 adapted for changes of the transmission speed by a factor N = 2.

FIG. 6 shows part of a modification of the receiver according to FIG. 1 which is adapted for changes the transmission speed by a factor N = 2. Corresponding components in FIGS. 1 and 6 are denoted by the same reference numerals, but are provided with indices in FIG. 6.

The first detection circuit 6′ includes a pulse distributor 8′ whose input is connected to line B′. The observation signals appear at the outputs $S_1'$ and $S'_2$ of a module-2-counter 11′. The gates $P'_1$ and $P'_2$ serve to determine the coincidence of the pulses appearing on line B′ at data signal transitions with the observation signals. In this preferred embodiment, the circuits $C'_1$ and $C'_2$ detecting the presence of pulses are constituted by up-down counters 30 and 31, respectively. These two counters each have a forward input UP a reverse input DO and a reset input R. The forward input UP of up-down counter 30 is connected to the output of an AND-gate 32, and input of which is connected to the output of AND-gate $P'_1$ through a line $E'_1$. Likewise the forward input UP of up-down counter 31 is connected to the output of an AND-gate 33, an input of which is connected to the output of AND-gate $P'_2$ through a line $E'_2$. The reverse input DO of up-down counter 30 is connected through an AND-gate 34 to the output of a frequency divider 35 having a division factor of 8 whose input is connected to line C′. The reverse input DO of up-down counter 31 is connected to this frequency divider 35 through an AND-gate 36.

Two position decodes are connected to each of the up-down counters 30 and 31: minimum position decoders 36 and 37 for up-down counters 30 and 31, respectively, and maximum position decoders 38 and 39 for up-down counters 30 and 31, respectively. The outputs of position decoders 36 and 37 are connected to the inputs of an OR-gate 40; the outputs of position decoders 38 and 39 are connected to the inputs of an AND-gate 41; the inputs of a third OR-gate 42 are connected to the outputs of gates 40 and 41, its output being connected to the two reset inputs R of up-down counters 30 and 31. The output of position decoder 38 is connected to the input of AND-gate 32 by means of an inverter 43; the output of position decoder 39 is connected to the input of AND-gate 33 by means of an inverter 44. The signal which indicates a reduction in the transmission speed and which is applied to commutation circuit 101′ appears at the output of OR-gate 40.

The operation of the first detection circuit 6′ is as follows. For the normal speed the probability of occurrence of pulses on the two lines $E'_1$ and $E'_2$ is the same. The contents of the two up-down counters 30 and 31 increase, although count down pulses are applied to their input DO. In fact, the repetition period of these count down pulses is eight times lower than that of the clock pulses, so that nevertheless the contents of the updown counters 30 and 31 increase when a normal transmission speed is used. As soon as one of the two counters 30, 31 has reached its maximum position, a pulse appears at the output of the relevant maximum position decoder so that the relevant counter is blocked because the gates connected to inputs UP and DO are closed. Likewise, the other counter will subsequently reach its maximum position, whereafter AND-gate 41 applies a signal to the reset input R of both up-down counters 30 and 31 so that these counters 30 and 31 occupy their initial position which corresponds to the average contents of these counters.

However, when the speed is twice as low, pulses only occur at the forward input UP of one of the counters 30, 31 and this counter will reach its maximum position and retain it, and the contents of the other counter are reduced to its minimum position. The relevant minimum position decoder then provides a pulse which is applied to commutation circuit 10' and also to OR-gate 42 so as to reset both counters 30 and 31 to their initial position.

In this embodiment of the receiver according to the invention, advantage is taken from the fact that the receiver is provided with a data detector 45 in the form of an integrated-and-dump circuit whose input connected to line A' receives the data signals. This data detector 45 applied its output signals to a line F. This detection method enables the terminals (not shown) of the transmission system to determine with more certainty the instantaneous value of the data signal when this data signal is submerged in noise to a greater or lesser extent.

In FIG. 6 this data detector 45 includes, for example, an operational amplifier 46 whose input is connected to line A' by means of a resistor 47 and whose input and output coupled by means of a capacitor 48. The components 46, 47 and 48 constitute an integrator. Furthermore a switch 49 is arranged in parallel with capacitor 48, which switch is controlled by a pulse generator 50. The pulse generator 50 provides short pulses at one of its outputs at every positive-going edge of the clock pulse signal from line C' so that the output voltage of amplifier 46 becomes zero at every positive-going edge of the clock-pulse signal.

The input of the second detection circuit 7' in FIG. 6 is conneected to line F. This circuit 7' is provided with a sampling circuit 51 controlled through pulse generator 50 by the clock pulse signal, a sample analyzer 52 which only generates pulses when the analyzed sample has a value which is lower than a certain fraction of the maximum output value of data detector 45. and a circuit $C'_L$ which has the same structure as circuits $C'_1$ and $C'_2$. This circuit $C'_L$ thus includes an up-down counter 53 to which is connected a minimum position decoder 54 and a maximum position decoder 55. The forward input UP of this counter 53 is connected to the output of sample analyzer 52, the reverse input DO is connected to the output of frequency divider 35, the reset input R is connected to the output of an OR-gate 56, whose two inputs are connected to the outputs of position decoders 54 and 55. The signal which indicates an increase in the transmission speed appears at the output of maximum position decoder 55.

The operation of this second detection circuit 7' is as follows.

Figure 7:
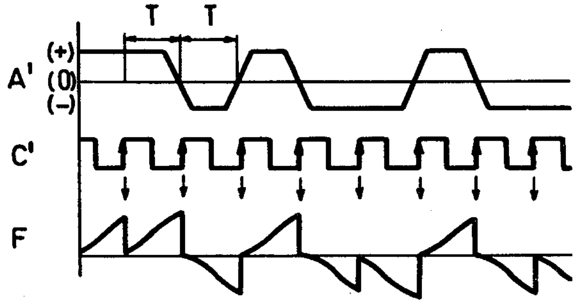
FIGS. 7 and 8 show a number of time diagrams to explain the operation of the receiver of FIG. 6 for a transmission speed increased by a factor of 2.

FIG. 7 shows the case where the transmission speed is normal, and the duration T of the data signal elements (compare A' in FIG. 7) is equal to the period of the clock pulse signal (compare C' in FIG. 7). FIG. 7 shows at F the data signal supplied by data detector 45. FIG. 7 shows that any closure of switch 49 causes a great transition in the signal F. In this case sample analyzer 52 does not generate a pulse and up-down counter 53 always return its minimum position and from there to its initial position in response to a signal at its reset input R.

Figure 8:
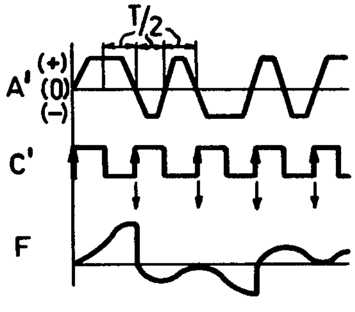

If the transmission speed is twice as high as normal, which is shown in FIG. 8, the signal present on line F may be substantially zero at the instant when a positive-going edge of the clock signal appears (compare C' and F in FIG. 8). This occurs whenever the data signal (compare A' in FIG. 8) exhibits a transition between its two opposite values which lies between two positive-going edges of the clock pulse signal.

In that case the closure of switch 49 does not cause a discontinuity in the signal supplied by amplifier 46. Pulses occur at the output of sample analyzer 52 which cause the contents of the up-down counter 53 to increase to its maximum position so that the signal indicating an increase in the transmission speed occurs at the output of maximum position decoder 55, which signal is applied to commutation circuit 10'. The OR-gate 56 renders resetting of the up-down counter 52 possible whenever an extreme position has been reached.

For the correct operation of sampling circuit 51, pulse generator 50 supplies sampling pulses which always occur slightly earlier than the pulses closing switch 49 in data detector 45 in response to positive-going edges of the clock pulse signal. For data signals assuming either a positive or a negative value sample analyzer 52 can then be formed in a simple manner as a threshold detector. This threshold detector then provides a pulse for a sample having a value which is lower than a given absolute value.

This second detection circuit 7' described hereinbefore may alternatively be used to detect an increase in the transmission speed by a factor different from two.

Figure 9:
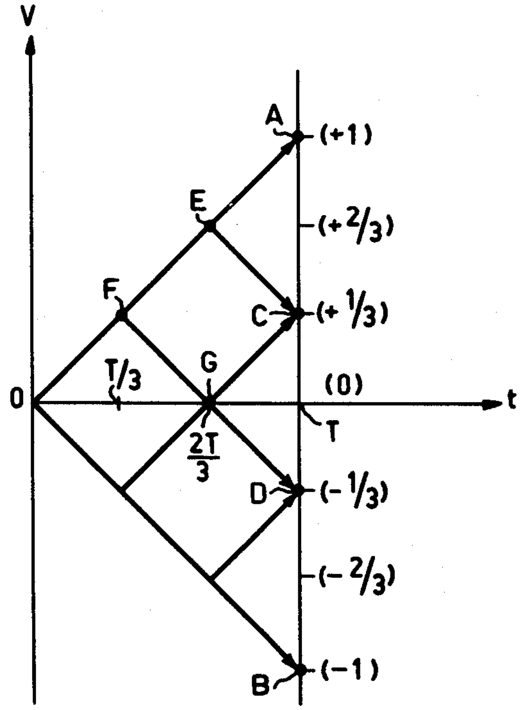
FIG. 9 shows a time diagram to explain a data detector used in the receiver of FIG. 6.

FIG. 9 shows the voltage V at the output of a data detector as shown in FIG. 6 between an instant $t = 0$ and an instant $t = T$. For the sake of clarity the variation of the voltage as a function of time is shown by segments of a straight line.

For a normal speed (the duration of the data signal elements is then equal to T) the voltage cannot vary otherwise then in accordance with the straight lines OA or OB. At the instant $t = T$, shortly before closing switch 49, the voltage at the output of the data detector may be denoted by $+ 1$ or $-1$.

For a higher speed (the duration of the data signal elements is equal to T/3) the value of the data signal at the output of the data detector may vary at least once during the time interval between the instants $t = 0$ and $t = T$. In that case the output voltage at the instant $t = T$, shortly before closing switch 49, can only be represented by the ordinate of the points C and D; the absolute value of the latter voltage is equal to one third of the voltage associated with the point A or B.

For example, for a series of two successive data signal elements each having a positive value and followed by a data signal element having a negative value, the shape of the data detector voltage is represented by the segments OF, FE and EC. For a series which starts with a data signal element having a positive value, followed by the data signal element having a negative value and finally by a data signal element having a positive value again, the shape of the data detector voltage is represented by the segments OF, FG and GC.

In this case, the threshold levels of sample analyzer 52 can be adjusted so that their absolute value is equal to ⅔ of the maximum absolute value which can be produced by the data detector. In the general case, this absolute value for the threshold levels can be expressed as (N-1)N times this maximum absolute value.

What is claimed is:

1. A receiver in a system for synchronous data transmission in which the data signals may be transmitted at least at two transmission speeds differing by a factor N, where N is an integer, said receiver being provided with a transition detector for generating pulses at transitions in the received data signal, a clock pulse generator included in a phase control loop to which the pulses from the transition detector are applied for controlling the phase of the clock pulses with the transitions of the received data signal, and a detector for detecting changes in the transmission speed of the received data signal, said speed change detector being provided with a circuit for detecting a decrease in the transmission speed by a factor N, said circuit including a pulse distributor controlled by the clock pulse generator for distributing the pulses from the transition detector in the rhythm of the clock pulses over N outputs, each of said outputs being connected through a circuit means for detecting the presence of pulses to logic selection gate, said gate generating an output signal when said circuit means detects the absence of pulses from at least at one of the N outputs of the pulse distributor.

2. A receiver as claimed in claim 1, characterized in that the speed change detector is also provided with a circuit for detecting an increase in the transmission speed by a factor N, said circuit including a circuit for sampling the received data signal, said circuit being controlled by a pulse generator connected to the clock pulse generator for generating a sampling pulse at least at one of the instants T/N, 2T/N, . . . . . , (N−1)T/N after the instant of occurrence of each clock pulse, where T is the period of the clock pulses, a sample analyzer connected to the sampling circuit, said analyzer only generating pulses for samples substantially corresponding to crossings of the received data signal through a given reference level, and a circuit for detecting the presence of pulses at the output of the sample analyzer and for generating an output signal in the presence of said pulses.

3. A receiver as claimed in claim 1 provided with a data detector in the form of an integrate-and-dump circuit controlled by the clock pulse generator, characterized in that the speed change detector is also provided with a circuit for detecting an increase in the transmission speed by a factor N, said circuit including a sampling circuit controlled by the clock pulse generator for sampling the output signal from the data detector, a sample analyzer connected to the sampling circuit, said analyzer only generating pulses for samples having an absolute value which is lower than (N-1)/N times the maximum absolute value of the data detector output signal, and a circuit for detecting the presence of pulses at the output of the sample analyzer and for generating an output signal in the presence of said pulses.

4. A receiver as claimed in claim 1, characterized in that the circuit means for detecting the presence of pulses comprises an operational amplifier connected as an integrator, said operational amplifier including an integration capacitor shunted by a resistor for obtaining a decay time constant for the integration signal which is much longer than the time interval between the pulses occurring at the input of said circuit, and a threshold circuit connected to said operational amplifier said circuit generating an output signal when its threshold level is exceeded by the integration signal.

5. A receiver as claimed in claim 1, characterized in that the circuit means for detecting the presence of pulses comprises an up-down counter having a forward input and a reverse input, one of the two inputs being connected to a pulse generator for generating pulses with a period which is much longer than the time interval between the pulses which occur at the input of the circuit and which are applied to the other input of the updown counter, and an extreme count position decoder, connected to the up-down counter, the output of said decoder output comprising the output of the circuit.

* * * * *

PO-1050
(5/69)

UNITED STATES PATENT OFFICE
CERTIFICATE OF CORRECTION

Patent No. 3876833 Dated April 8, 1975

Inventor(s) Pierre Louis Vincent Breant

It is certified that error appears in the above-identified patent and that said Letters Patent are hereby corrected as shown below:

ON THE TITLE PAGE

Section 30, line 2, should read 7239931 rather than 72.39931;

IN THE SPECIFICATIONS

Column 1, line 51, "a high transmission speed" should read "a higher transmission speed";

column 6, line 59 "circuit 101'" should read "circuit 10'";

IN THE CLAIMS

Column 9, line 27, "through a circuit means" should read "through circuit means";

Signed and Sealed this

*twenty-ninth* Day of *July 1975*

[SEAL]

*Attest:*

RUTH C. MASON
*Attesting Officer*

C. MARSHALL DANN
*Commissioner of Patents and Trademarks*